US011656083B2

(12) United States Patent
Yu et al.

(10) Patent No.: US 11,656,083 B2
(45) Date of Patent: May 23, 2023

(54) AUTONOMOUS TUNNEL NAVIGATION WITH A ROBOTIC SYSTEM

(71) Applicant: Intel Corporation, Santa Clara, CA (US)

(72) Inventors: Fang Fina Yu, Chengdu (CN); Hu Tiger Chen, Beijing (CN); Xuejuan Snow Dong, Chengdu (CN)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 16/473,608

(22) PCT Filed: Mar. 31, 2017

(86) PCT No.: PCT/CN2017/078928
§ 371 (c)(1),
(2) Date: Jun. 25, 2019

(87) PCT Pub. No.: WO2018/176358
PCT Pub. Date: Oct. 4, 2018

(65) Prior Publication Data
US 2020/0149892 A1     May 14, 2020

(51) Int. Cl.
*G01C 21/16*     (2006.01)
*G01C 21/00*     (2006.01)
(Continued)

(52) U.S. Cl.
CPC ....... *G01C 21/1652* (2020.08); *G01C 21/005* (2013.01); *G01C 21/14* (2013.01);
(Continued)

(58) Field of Classification Search
CPC ..... G01S 17/42; G01S 5/0263; G01C 21/005; G01C 21/165
See application file for complete search history.

(56) References Cited

U.S. PATENT DOCUMENTS 6,922,632 B2    7/2005  Foxlin
7,069,124 B1    6/2006  Whittaker et al.
(Continued)

FOREIGN PATENT DOCUMENTS

CN    102636166 A    8/2012
CN    106200633 A    12/2016
(Continued)

OTHER PUBLICATIONS

"International Application Serial No. PCT/CN2017/078928, International Search Report dated Dec. 29, 2017", 4 pgs.
(Continued)

*Primary Examiner* — Jelani A Smith
*Assistant Examiner* — Toya Pettiegrew
(74) *Attorney, Agent, or Firm* — Banner & Witcoff Ltd.

(57) ABSTRACT

A robotic system is disclosed that uses autonomous tunnel navigation. The system includes a plurality of sensors (e.g., ranging, odometry) to measure a distance from the robotic system to a plurality of walls. Memory stores instructions and a processor is coupled to the memory and the plurality of sensors to execute the instructions. The instructions cause the robotic system to detect movement of the robotic system through a surrounding environment based on sensor measurements, determine if the robotic system is in a tunnel based on the sensor measurements, and navigate with the odometry-based sensor when the robotic system is determined to be in the tunnel or the ranging sensor when the robotic system is determined to be not in the tunnel.

24 Claims, 5 Drawing Sheets

(51) Int. Cl.
  *G01C 21/14* (2006.01)
  *G01C 21/20* (2006.01)
  *G01S 17/42* (2006.01)
  *G01S 13/931* (2020.01)

(52) U.S. Cl.
  CPC .......... *G01C 21/206* (2013.01); *G01S 13/931* (2013.01); *G01S 17/42* (2013.01)

(56) References Cited

U.S. PATENT DOCUMENTS

| | | | |
|---|---|---|---|
| 7,539,557 B2 | 5/2009 | Yamauchi | |
| 7,979,203 B2* | 7/2011 | Haag | B60Q 3/18 701/412 |
| 10,539,676 B2* | 1/2020 | Li | G01C 21/3848 |
| 2005/0134440 A1* | 6/2005 | Breed | G01S 17/931 701/45 |
| 2006/0025897 A1* | 2/2006 | Shostak | G08G 1/017 701/1 |
| 2009/0043439 A1* | 2/2009 | Barfoot | G05D 1/0297 701/25 |
| 2013/0268118 A1* | 10/2013 | Grinstead | B25J 13/006 700/259 |
| 2015/0253427 A1* | 9/2015 | Slichter | G01S 7/4808 356/5.01 |
| 2021/0001480 A1* | 1/2021 | Artes | G05D 1/0066 |

FOREIGN PATENT DOCUMENTS

| | | |
|---|---|---|
| EP | 1983397 A2 | 10/2008 |
| EP | 2527943 A1 | 11/2012 |
| WO | WO-2018176358 A1 | 10/2018 |

OTHER PUBLICATIONS

"International Application Serial No. PCT/CN2017/078928, Written Opinion dated Dec. 29, 2017", 4 pgs.

Hemerly, Elder M, et al., "Implementation of a GPS/INS/Odometer Navigation System", ABCM Symposium Series in Mechatronics—vol. 3—, (2008), 519-524.

* cited by examiner

US 11,656,083 B2

AUTONOMOUS TUNNEL NAVIGATION WITH A ROBOTIC SYSTEM

CLAIM OF PRIORITY

This application is a U.S. National Stage Application under 35 U.S.C. 371 from International Application No. PCT/CN2017/078928, filed Mar. 31, 2017, published as WO 2018/176358, which is incorporated herein by reference in its entirety.

TECHNICAL FIELD

Embodiments described herein pertain in general to robotic navigation and in particular to autonomous robotic navigation through feature-less tunnels.

BACKGROUND

Light detection and ranging (LIDAR) is typically used by robotic systems for autonomous navigation in an indoor environment. LIDAR, as is known in the art, transmits light signals (e.g., laser) that are bounced off of walls and objects to determine the layout of a room. The layout may then be used by the robotic system in navigating the room.

Tunnels (e.g., long feature-less corridors) may cause issues with LIDAR since there are not enough features for the light signals to bounce off of in order for the robotic system to build an accurate map and determine navigation information for movement. For example, the robotic system may move down a relatively long tunnel and not be able to determine any differences in features along the way. In such a feature-less environment, the robotic system would not be able to build a map of the tunnel or the map would be inaccurate.

DETAILED DESCRIPTION

LIDAR may be used by robotic systems (e.g., robots) to create maps of the environment surrounding the robot. For example, by transmitting a light signal (e.g., laser) in a pattern (e.g., 360°) around the robot, the environment may be mapped from the received reflections of the laser off of any obstacles (e.g., walls, furniture, objects). The environment map may then show the obstacles that the robot needs to navigate around to avoid a collision in order to safely traverse the environment from a starting point to a destination.

Tunnels present a localization problem for the robot. As used herein, the term "tunnel" may mean any relatively long, feature-less corridor. The length of the corridor may be such that the robot may not detect an end of the corridor from a location at the beginning of the corridor. Additionally, there may be such a dearth of features in the tunnel from the beginning of the tunnel to the end of the tunnel that the robotic system cannot build an accurate map of the corridor. While the robotic system may still use LIDAR to navigate around obstacles, without environmental features with which to build the map, the robot may have difficulty determining its location with respect to the environment. The robot may thus have trouble accurately traversing a course from the starting point to the destination without the ability to accurately determine its position relative to the environment.

Figure 1:
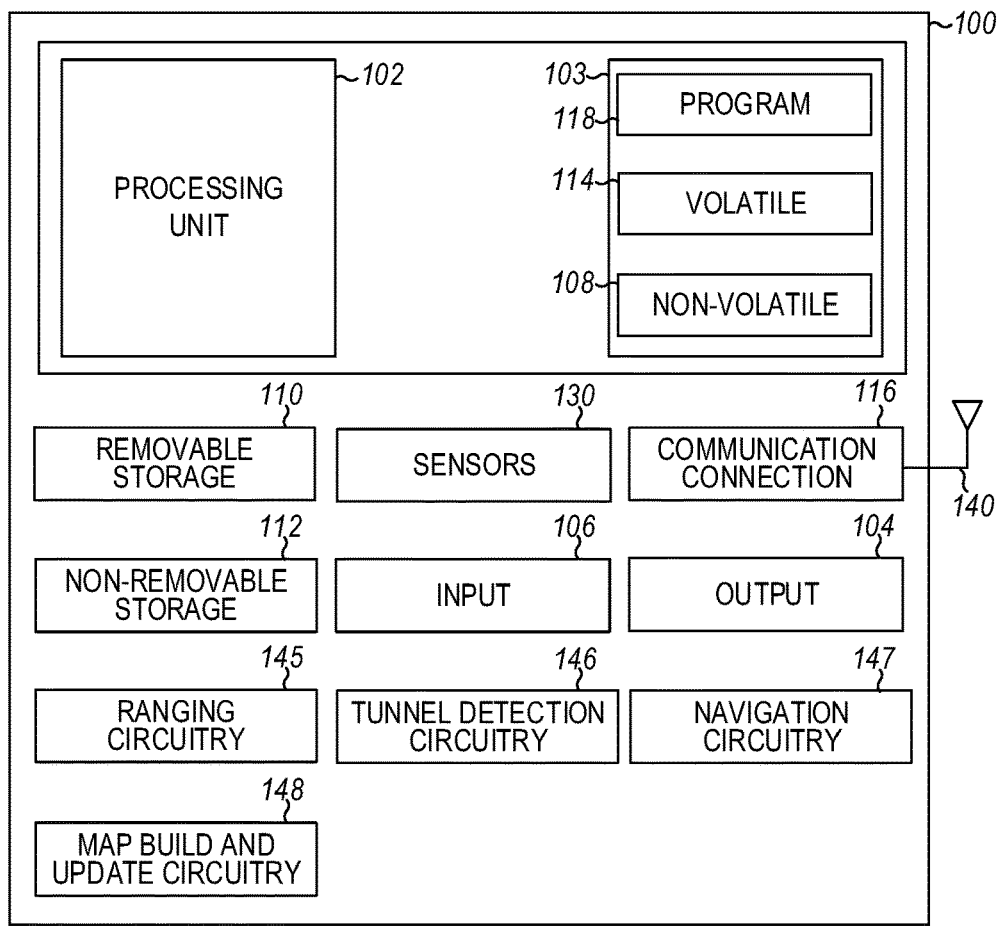
FIG. 1 is a block diagram of a robotic system for performing methods, according to various embodiments.

FIG. 1 is a block diagram of a robotic system (e.g., robot) for performing methods, according to various embodiments. This diagram is for purposes of illustrating a robot. Some components may not be used in all embodiments. The robot may also be referred to as a computing device or a computer 100.

One example robot 100 may include a processing unit 102, memory 103, removable storage 110, and non-removable storage 112. The processing unit 102 may comprise one or more processors (e.g., control circuitry) that execute instructions stored in memory 103 to execute any of the methods disclosed herein. Although the various data storage elements are illustrated as part of the robot 100, the storage may also or alternatively include cloud-based storage accessible via a network, such as the Internet or server based storage that is accessible over a wired or wireless channel.

The memory 103 may include volatile memory 114 and non-volatile memory 108. The robot 100 may include, or have access to, a computing environment that includes a variety of computer-readable media, such as volatile memory 114 and non-volatile memory 108, removable storage 110 and non-removable storage 112. Computer storage includes random access memory (RAM), read only memory (ROM), erasable programmable read-only memory (EPROM) and electrically erasable programmable read-only memory (EEPROM), flash memory (e.g., solid state disks (SSDs)) or other memory technologies, compact disc read-only memory (CD-ROM), Digital Versatile Disks (DVD) or other optical memory storage, magnetic cassettes, magnetic tape, magnetic disk storage or other magnetic storage devices, or any other medium capable of storing computer-readable instructions.

The robot 100 may include or have access to a computing environment that includes an input 106, an output 104, and a communication connection 116. The output 104 may include a display device, such as a touchscreen, that also may serve as an input device. The input 106 may include one or more of a touchscreen, touchpad, mouse, keyboard, camera, one or more device-specific buttons, one or more sensors integrated within or coupled via wired or wireless data connections to the robot 100, and other input devices.

The robot 100 may operate in a networked environment using the communication connection 116 to connect to one or more remote computers, such as database servers, over a wired or wireless channel. The communication connection 116 may include any radios and antennas 140 necessary to implement one or more radio access technologies. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Sensors 130 may include global positioning system (GPS) or other satellite navigation sensors, inertial navigation sensors, a LIDAR system (both laser and light detection), radio detection and ranging (RADAR), temperature, imaging devices, or any other sensors usable by a robot. The sensors 130 provide the processing unit 102 with the ability to scan the environment using images, light, sound, or other frequencies. The sensors 130 may also include an odometry-based sensor that determines the speed and distance that the robot 100 moves based on a sensor that tracks wheel rotation count and wheel rotation speed or robotic leg movement. The LIDAR, RADAR, or other electromagnetic-based sensors may be jointly referred to as ranging sensors.

The odometry-based sensor, that may be used for determining the robot's movement (e.g., speed distance), uses data from motion sensors (e.g., mechanical, light) to estimate change in position of the robot over time relative to a starting location. For example, a mechanical or light sensor may be used to monitor wheel rotation (e.g., rotation count and speed of rotation) and determine both speed and distance movement by the robot based on the number of rotations of the wheels over a predetermined time period.

Computer-readable instructions stored on a computer-readable medium are executable by the processing unit 102 of the robot 100. A hard drive, CD-ROM, and RAM are some examples of articles including a non-transitory computer-readable medium such as a storage device.

The robot 100 may further include ranging circuitry 145 to access sensor measurements from the ranging sensor and detect location and movement of the robotic system through the surrounding environment. Tunnel detection circuitry 146 determines if the robotic system is in a tunnel based on the sensor measurements from the ranging sensor. Navigation circuitry 147 navigates the robotic system with the odometry-based sensor when the robotic system is determined to be in the tunnel or the ranging sensor when the robotic system is determined to be not in the tunnel. Map build and update circuitry 148 builds and updates a map of the surrounding environment based on the ranging sensors.

Figure 2:
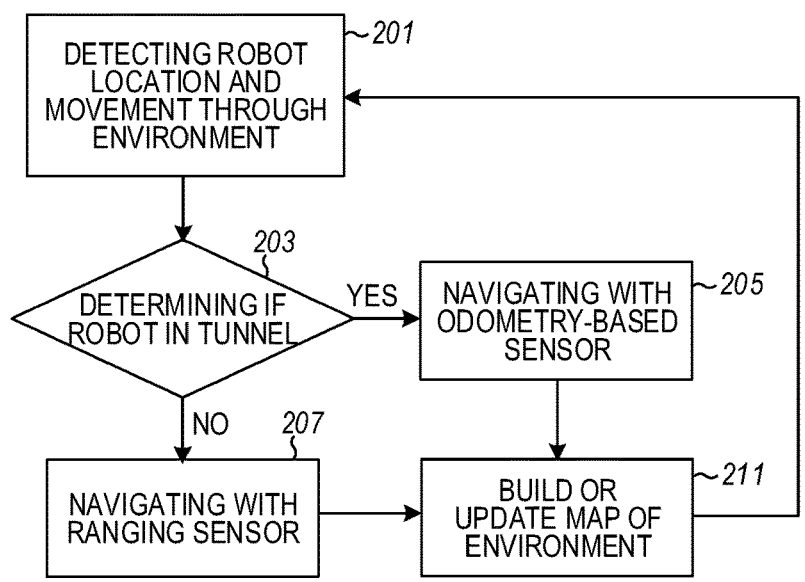
FIG. 2 is a flowchart of a method for robotic system operation, according to various embodiments.

FIG. 2 is a flowchart of a method for robotic system operation, according to various embodiments. During this method, the robot may be simultaneously executing one or more localization and mapping (SLAM) methods such as LIDAR-based SLAM, visual-based SLAM (e.g., images for mapping), or odometry-based SLAM (e.g., movement tracking through monitoring of wheel/leg movement).

SLAM is a method for constructing or updating a map of an unknown environment while simultaneously keeping track of a robot's location within that environment. The localization portion of SLAM determines the robot's location (e.g., based on Cartesian coordinates with the robot as the origin) within the environment while the mapping portion constructs and extends the map with a new perception of the environment such as input from a LIDAR scan. The different versions of SLAM (e.g., LIDAR-based, visual-based, odometry-based) provide generally the same localization data with different levels of accuracy. For example, the LIDAR-based SLAM is considered to be the most accurate due to its light-based measurements.

While some or all of these SLAM methods may be executing substantially simultaneously, not all of their resulting map data may be used for navigation of the robot. The selected form of navigation used by the robot is based on whether the robot is in a tunnel. When it is detected that the robot has entered a tunnel, the odometry-based navigation may be used. When it is detected that the robot has exited the tunnel, the robot may switch back to the more accurate LIDAR-based navigation.

In block 201, the robot location and movement through the environment is detected. This may be accomplished using one or more of the robotic system sensors (e.g., GPS, light, wheel or leg movement). As the robot moves, it performs one or more of the above-described SLAM methods in determining its location. However, only the data from one of the SLAM methods may be used at any one time. Typically, it is desirable to use the more accurate LIDAR-based localization and navigation method when possible.

Figure 4:
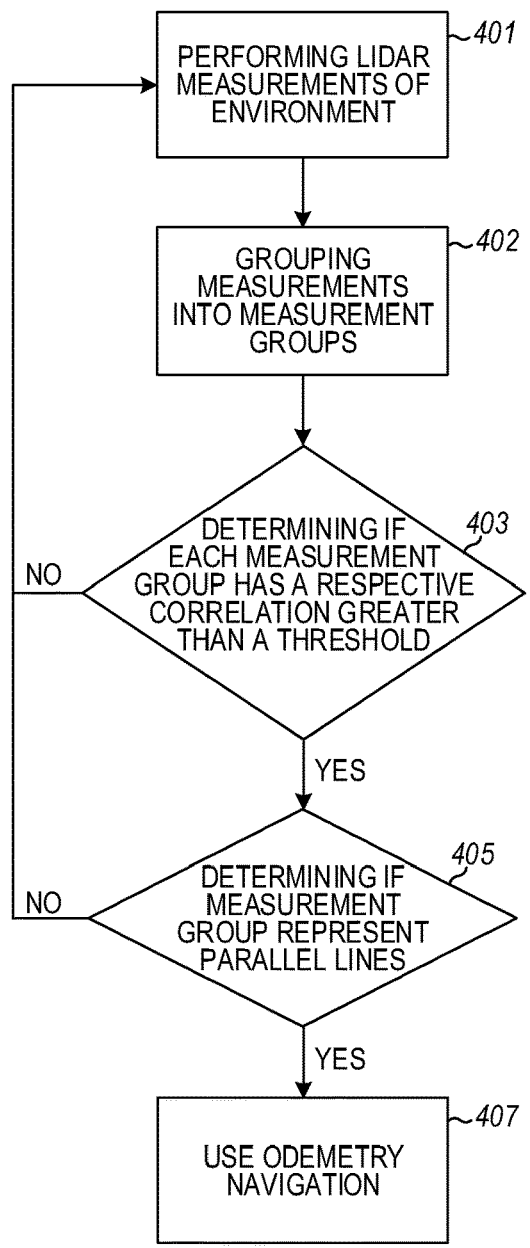
FIG. 4 is a flowchart of a method for tunnel detection, according to various embodiments.
Figure 5:
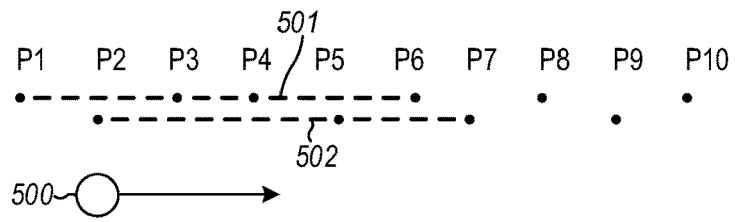
FIG. 5 illustrates a diagram of another robotic system example environment, according to various embodiments.

In block 203, it is determined if the robot has entered a tunnel. This may be accomplished by determining if the walls in the immediate environment around the robot are substantially parallel. Substantially parallel may be defined as being within an empirically determined error of being parallel (e.g., having an included angle of less than 1.5°). If the walls are not parallel, the differences between the walls (e.g., angled, offset, curved) may provide sufficient features for the robot to relatively accurately determine its location and update its map for navigation. For example, FIGS. 3A-3D provide examples of various environments that a robot may experience that comprise some form of corridor and may or may not be classified as a tunnel. FIGS. 4 and 5 provide alternate methods for tunnel detection based on wall parallelism and correlation.

In block 205, if the robot determines that it is in a tunnel, the robot navigates with an odometry-based sensor through the tunnel. The process then repeats back to step 201 so that, when the robot exits the tunnel, it reverts back to using the more accurate LIDAR-based navigation results for localization and navigation. In block 207, if the robot determines that it is not in a tunnel, the robot navigates with the more accurate ranging sensor (e.g., LIDAR) to move through the environment. The data collected during the robot's movement through the tunnel or non-tunnel environment is used in block 211 to build or update a map of the environment. If this is the first time that the robot has collected data for that particular environment, the map is initially built. If the robot has been through the environment before, the map may be updated based on the newly collected data.

FIGS. 3A-3D are diagrams of various robotic system example environments, according to various embodiments. The example environments are shown for the purposes of illustrating the method of FIG. 4. A robot may encounter various other environments and the disclosed methods would operate in a substantially similar manner.

Due to sensor error and environmental factors (e.g., lighting, objects air quality), not all of the LIDAR data may be strictly located on the two lines 301, 302 representing the environment walls. The resulting LIDAR measurement data points (e.g., each data point represented by "x") may be randomly located around the two lines 301, 302. The methods of FIGS. 4 and 5 are examples of just two real-time methods for 1) detecting if the measurement data points represent lines (e.g., walls) and 2) detecting the parallelism of the lines.

In each of FIGS. 3A-3D, the position of the robot 300 is noted within the two lines 301, 302 and a path is shown as it moves through the environment. In the following embodiments, as the robot 300 moves through the environment, it takes a frame of data (e.g., data measurement) by transmitting a light signal and receiving a reflected light signal from objects or a wall. The time difference between the transmitted light signal and the received light signal may be used to calculate the distance of the measured data point from the robot 300 (e.g., distance=(time×speed=(time×300 k m/s)/2 for one-way distance). The robot 300 then uses a coordinate system in which the robot 300 is the origin (0, 0) for each data measurement. Each measured data point (e.g., represented by "*") may then be assigned a position in that coordinate system relative to the robot 300. In the following discussion, each data point measured by the robot is represented by ($x_n$, $y_n$).

Figure 3A:
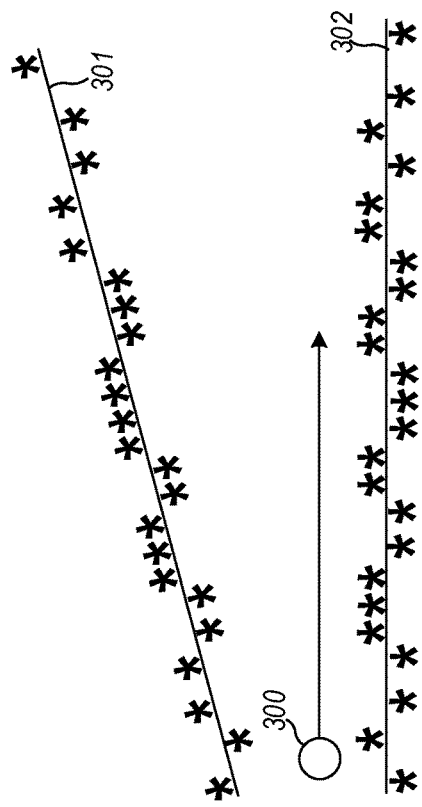
FIGS. 3A-3D are diagrams of various robotic system example environments, according to various embodiments.

Referring to FIG. 3A as an example for illustrating the concept, $y_i$ may represent the distance of the upper and lower sets of data points (e.g., lines 301, 302) referenced from the robot 300 (e.g., origin). Thus, $x_n$ may represent the left or right distance of each data point from the robot 300. The other environments of FIGS. 3B-3D may follow the same convention.

Using such a coordinate system, a data point on the upper line 301 may have a +$y_n$ while a data point on the lower line 302 may have a -$y_n$. Similarly, a data point behind the robot 300 may have a -$x_n$ while a data point in front of the robot 300 may have a +$x_n$. In these examples, "behind" and "front" are with respect to the direction of travel. The robot 300 may not have a convention front and back, such as with an amorphous body shape, or the robot 300 may be travelling in the direction of the path but with a portion of the robot 300 being turned off-center from the direction of travel (e.g., a humanoid robot walking sideways). Thus, a data point above and behind the robot 300 may be represented by (-$x_n$, +$y_n$), a data point above and in front of the robot 300 may be represented by (+$x_n$, +$y_n$), a data point below and behind the robot 300 may be represented by (-$x_n$, -$y_n$), and a data point below and in front of the robot 300 may be represented by (+$x_n$, -$y_n$). These convention are only for purposes of illustration and other embodiments may use an opposite convention.

The following methods may group the measured data points into two groups (e.g., one for each wall), based on the distance from the robot 300 (e.g., $y_n$) and determine if each group of the measurement data points represents a line 301, 302. For example, each group of data points may have a y that is relatively close to each other within each respective group. The degree of parallelism exhibited by the lines 301, 302 and, thus, in determining whether the robot is located in a tunnel. FIGS. 3A-3D will be referenced together with the method of FIG. 4.

FIG. 4 illustrates a flowchart of a method for tunnel detection, according to various embodiments. This method applies a correlation factor using a least squares approach to determine if the measured data point represent lines. The slope of the lines may be determined to determine the degree of parallelism of the lines.

The method of least squares is an approach used in regression analysis to approximate a solution of overdetermined systems (e.g., sets of equations in which there are more equations than unknowns). Starting with a collection of points with coordinates given by ($x_n$, $y_n$), any straight line may pass among these points and will either go above or below each of these points. The distances from these points to the line may be determined by choosing a value of x and then subtracting the observed y coordinate that corresponds to this x from the y coordinate of the line.

Different lines through the same set of points would give a different set of distances. It is desirable for these distances to be as small as possible. But, since the distances can be either positive or negative, the sum total of all these distances will cancel each other out and equal zero. Thus, the solution is to eliminate all of the negative numbers by squaring the distances between the points and the line. This gives a collection of nonnegative numbers. This approach is used in data fitting of the LIDAR data measurements to each of their respective lines 301, 302 representing the walls of the environment.

Since, due to sensor errors and environmental conditions, the LIDAR data shown along each line 301, 302 representing a wall may not strictly track each line 301, 302, the correlation coefficient may be used to determine how closely the data exhibits a straight line. The values for the correlation coefficient R may be any real number in a range between −1 to 1. An R close to 0 implies that there is little linear relationship between the data. An R close to 1 implies that there is a positive linear relationship between the data (e.g., as x increases, y also increases). An R close to −1 implies that there is a negative linear relationship between the data (e.g., as x increases, y decreases). Thus, a line having a positive R close to 1 has a positive slope while a line having a negative R close to −1 has a negative slope.

In the present embodiments, an R relatively close to 1 or −1 may be defined as data points having a high correlation. For example, using empirical analysis for the illustrated scenarios, data points having an R that is greater than a threshold of 0.95 may be defined as having a linear relationship. Other embodiments may use other definitions of a high correlation.

Referring to FIG. 4, in block 401, the robot 300 performs LIDAR measurements of the environment. This is represented in the embodiments of FIGS. 3A-3D as the robot 300 moving through the respective environments and generating data points represented by the "*" based on a respective reflected light signal.

In block 402, the robotic system groups the LIDAR measurements into measurement groups. The measurements in each measurement group may have a substantially same distance from the robotic system as other measurements in that particular group (e.g., within 10 centimeters of each other). For example, the measurements may be grouped according to one plane (e.g., along x-axis) of the data points being relatively close to each other.

In block 403, it is determined if each measurement group has a respective correlation coefficient greater than a threshold (e.g., 0.95). In other words, this step determines if each measurement group represents a line. This may be accomplished using $$R = \frac{n(\sum xy) - (\sum x)(\sum y)}{\sqrt{\left[n\sum x^2 - (\sum x)^2\right] * \left[n\sum y^2 - (\sum y)^2\right]}},$$

where n is the number of data points in each group and:

$$\sum xy = \frac{(x_1 * y_1 + x_2 * y_2 + \ldots + x_n * y_n)}{n};$$

$$\sum x \sum y = \left(\frac{(x_1 + x_2 + \ldots + x_n)}{n}\right) * \left(\frac{(y_1 + y_2 + \ldots + y_n)}{n}\right);$$

$$\sqrt{\left[n\sum x^2 - (\sum x)^2\right] * \left[n\sum y^2 - (\sum y)^2\right]} =$$

$$sqrt \text{ of } \left\{\left[\frac{(x_1 x_1 + x_2 x_2 + \ldots + x_n x_n)}{n} - \frac{(x_1 + \ldots + x_n) * (x_1 + \ldots + x_n)}{n}\right] *\right.$$

-continued $$\left[\frac{(y_1y_1+y_2y_2+\ldots+y_ny_n)}{n}-\frac{(y_1+\ldots+y_n)*(y_1+\ldots+y_n)}{n}\right]\right\}$$

Figure 3B:
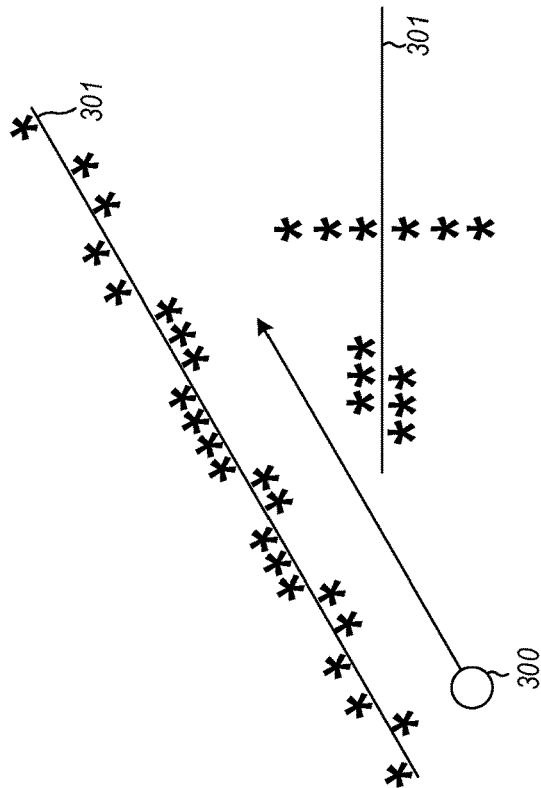
Figure 3C:
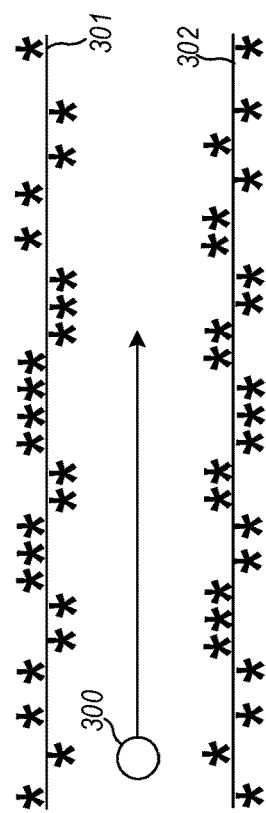
Figure 3D:
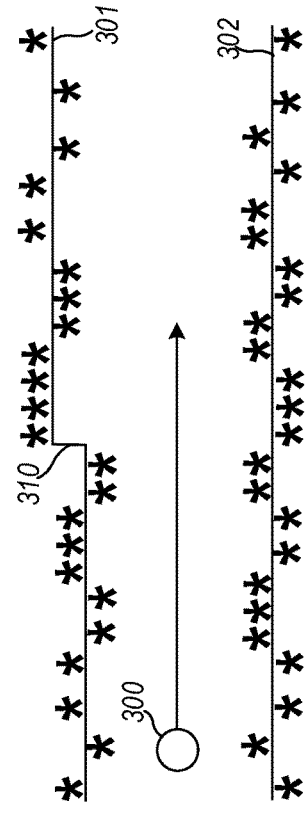

Applying the correlation equation R to the environments of FIGS. 3A-3D, it can be seen that both FIGS. 3A and 3B illustrate walls 301, 302 are in fact linear. The environments in FIGS. 3C and 3D are not linear. In FIG. 3C, the upper wall 301 has a break 310 in the middle that causes the LIDAR measurements to be moved a little farther out from the robot 300. The break 310 is enough of a feature that the robot will be able to use that break 310 to navigate by LIDAR. In FIG. 3D, only the first group of LIDAR measurements can be fit to a line 301. The second group of LIDAR measurements cannot be fit to line 302. Thus, the second group of LIDAR measurements may also be used as one or more features to enable LIDAR navigation.

Once it has been determined that the respective LIDAR measurement groups represent lines (e.g., walls), in block 405 it is determined if the lines 301, 302 are parallel. This may be accomplished by determining the slope of each line 301, 302. If the slopes are substantially equal, then the lines 301, 302 are considered to be parallel. In an embodiment, an included angle of less than a predetermined threshold (e.g., 1.5°) between the two lines 301, 302 may be used to conclude that the lines are parallel. The included angle threshold may be determined by empirical testing to determine which included angle provides adequately parallel walls.

In an embodiment, since the x and y coordinates of the data points for the lines are known, the slopes for each line 301, 302 may be determined by a standard rise over run technique that is well known in the art. For example, the slope may be determined by identifying two points on the line: $(x_1, y_1)$, $(x_2, y_2)$, then determining the slope of the line by slope=$(y_2-y_1)/(x_2-x_1)$.

The slopes of the lines may also be determined using a standard deviation analysis. For paired data $(x_n, y_n)$ the standard deviation of the x data may be represented by $S_x$ and the standard deviation of the y data may be represented by $S_y$. The formula for the slope a of each line 301, 302 may then be determined by $a=r(S_x S_y)$. The calculation of the standard deviation involves taking the positive square root of a nonnegative number. As a result, both standard deviations in the formula for the slope should be nonnegative. If it is assumed that there is some variation in the data, the possibility that either of these standard deviations are zero may be disregarded. Thus, the sign of the correlation coefficient is the same as the sign of the slope of the regression line.

Applying this slope computation to the environment of FIGS. 3A and 3B, that have been determined to be lines, it can be seen that FIG. 3A represents LIDAR measurement data that is linear as well as parallel. Thus, in block 407 of FIG. 4, it can be seen that odometry navigation would be used in the environment of FIG. 3A since that figure represents a tunnel.

In FIG. 4, if any one of the tests for determining if each measurement group has a correlation coefficient greater than a threshold (e.g., represent a line) in block 403 or determining if the measurement groups represent parallel lines in block 405 is false, the method returns to obtaining another LIDAR measurement frame. The process then repeats. It can be seen that, until enough LIDAR measurement data has been obtained, it cannot be determined whether the data has a high correlation coefficient or is parallel. In an embodiment, at least two data points in each measurement group may be necessary.

FIG. 5 illustrates a diagram of another robotic system example environment, according to various embodiments. This figure shows a plurality of LIDAR measurement data points referred to as P1-P10. As in previous embodiments, these measurement data points are determined by the robot 500 using LIDAR to bounce a light signal off of a wall or object and calculate the distance between the robot 500 and the LIDAR measure data point P1-P10 by measuring the time difference between transmission of the original light signal and reception of the reflected light signal.

In an ideal situation, if the reflecting object is a wall, all the LIDAR measurement data points would be in a straight line. In such a scenario, straight lines could be drawn between adjacent point pairs (e.g., P1 and P2), (P3 and P4), . . . (Pn−1 and Pn), and the slopes of the resulting line calculated. If all of the slopes are the same value, then the lines are parallel.

However, in a practical scenario due to environmental error and sensor error, the LIDAR measurement data points are not located along a straight line, as illustrated in FIG. 5. These points are actually randomly distributed around a straight line. If lines are drawn between adjacent points and the slopes of these lines determined, it may be seen that the slopes vary greatly.

In order to minimize the impact of the environmental/sensor errors, LIDAR measurement data point pairs are chosen that are spaced apart by a number of measurement data points. As only one example, the lines may be drawn between LIDAR measurement data point pairs that are five data points apart. Thus, in the illustrated example of FIG. 5 point pairs (P1, P6), (P2, P7), (P3, P8), (P4, P9), (P5, P10), (P6, P11), . . . (Pn−5, Pn) are selected and straight lines drawn between them. This operation may be represented by (Pn−x, Pn) wherein x>1, n represents a measurement data point number, Pn−x represents a first sensor measurement point having an x-axis and y-axis coordinate, and Pn represents a second sensor measurement point having an x-axis and y-axis coordinate. In the illustrated example, x=5. However, other embodiments may set x as some other positive integer. The robot 500 is also the origin (0, 0) for each sensor measurement.

Figure 6:
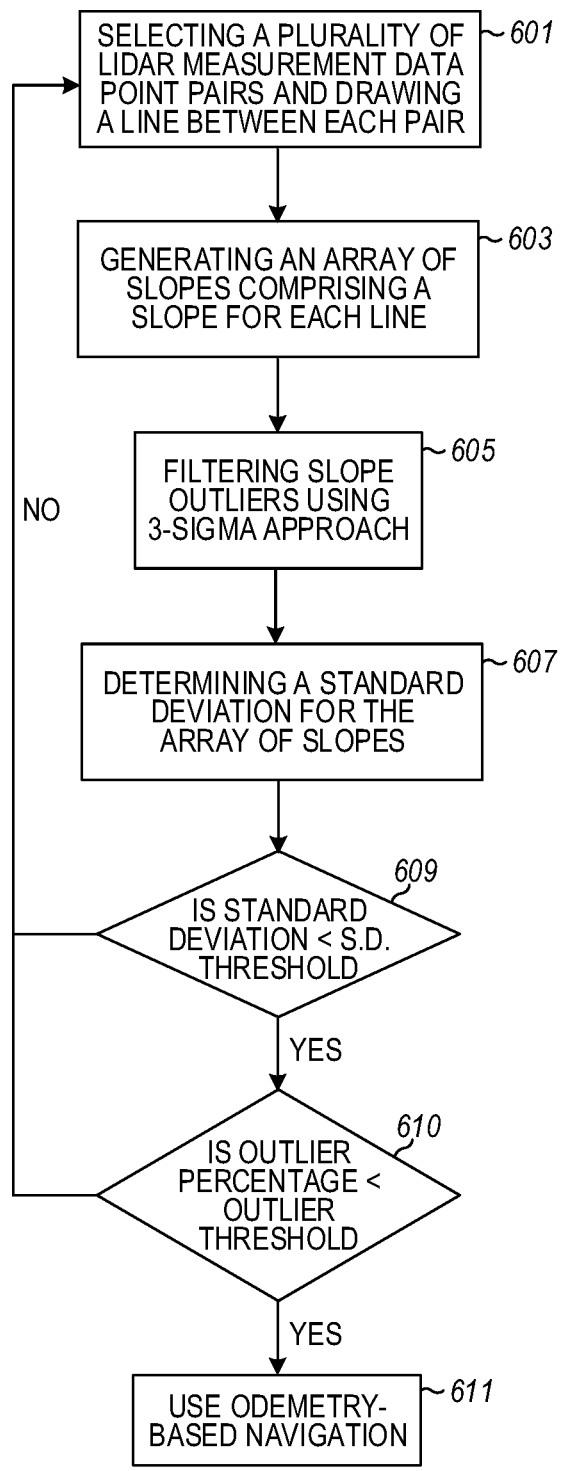
FIG. 6 illustrates a flowchart of another method for tunnel detection, according to the embodiment of FIG. 5.

FIG. 6 illustrates a flowchart of another method for tunnel detection, according to the embodiment of FIG. 5. In block 601, a plurality of LIDAR measurement data point pairs are selected and a line constructed between each data point pair. In block 603, an array of slopes (e.g., slope 1, slope 2, slope 3, . . . slope n) is generated that comprises a respective slope for each of the data point pair lines. In block 605, slope outliers in the array of slopes are filtered using a 3-sigma process and based on empirical research. This block determines a slope error threshold for the array of slopes. The slope error threshold is on either side of the mean of the slopes of the array of slopes.

The 3-sigma approach expresses a conventional heuristic that "nearly all" values are taken to lie within three standard deviations of the mean. In other words, it is empirically useful to treat a 99.7% probability as "near certainty" that the lines have the same slope. Thus, the line slopes that lie outside of the three standard deviations of the mean may be considered to not have the same slope as the rest of the lines. The percentage of slope outliers that lie outside of the three standard deviations of the mean is determined. The percentage of slope outliers is compared to an outlier percentage threshold (e.g., <8%).

In block 607, the standard deviation of the array of slopes is determined. In block 609, the standard deviation is compared to a standard deviation threshold (e.g., <0.05). If the determined standard deviation is greater than the standard deviation threshold, the robot is not in a tunnel and the method repeats from block 601.

If the standard deviation is less than the standard deviation threshold, in block 610, it is determined if the outlier percentage is less than the outlier percentage threshold. If the outlier percentage is greater than the outlier percentage threshold, then the robot is not in a tunnel and the method repeats from block 601. Otherwise, both the standard deviation and the outlier percentage are less than their respective thresholds and the lines are assumed to be parallel and the robot has been determined to be in a tunnel. In block 611, the robot uses odometry-based navigation since there are not enough features in the tunnel for the robot to use LIDAR measurements.

The outlier percentage threshold and the standard deviation threshold may be determined by empirical research. Values expressed in this discussion are for purposes of illustration only as other scenarios may use different thresholds. The illustrated thresholds may be adjusted depending on the situation and the robotic system being used. However, failure to detect a tunnel or misinterpreting the data to detect a tunnel that does not exist may result from thresholds that are set too high.

Figures 7, 8:
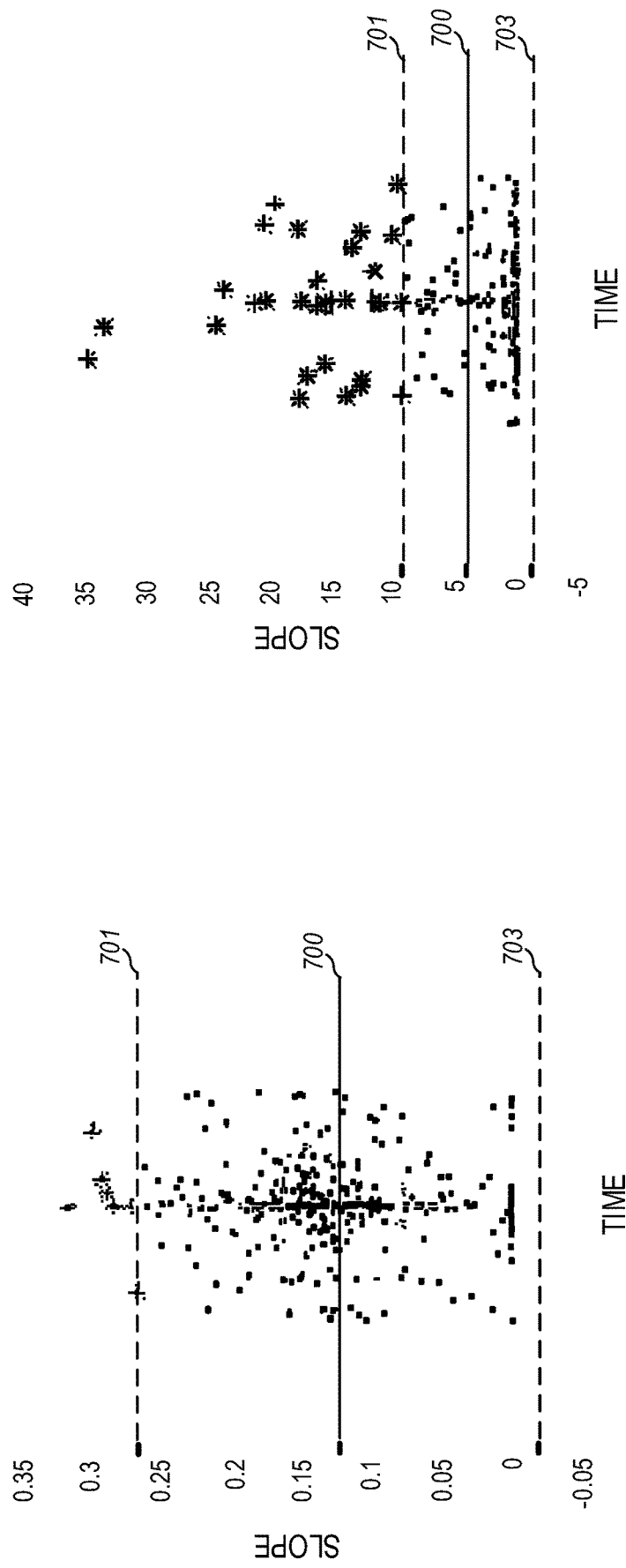
FIG. 7 illustrates a distribution of slope value versus time for a tunnel environment, according to various embodiments.
FIG. 8 illustrates a distribution of slope value versus time for a non-tunnel environment, according to various embodiments.

FIG. 7 illustrates a distribution of slope value versus time for a tunnel environment, according to various embodiments. FIG. 8 illustrates a distribution of slope value versus time for a non-tunnel environment, according to various embodiments. Both of these plots show the line slopes, determined in FIGS. 5 and 6, along the y-axis and time along the x-axis.

The mean value of the slopes is illustrated as the solid line 700. The mean value of the slopes plus three standard deviations is shown as dashed line 701. The mean value of the slopes minus three standard deviations is shown as dashed line 703. Any slope value that is located outside of the limit lines 701, 703 is considered an outlier slope. It can be seen that, in FIG. 7, the majority of the slope values are located within the limit lines 701, 703. Thus, the robot that generated the LIDAR measurement data points on which the slopes are based is located in a tunnel environment. In FIG. 8, the majority of the slope values are outside of the limit lines 701, 703. Thus, the robot that generated the LIDAR measurement data points on which the slopes are based is located in a non-tunnel environment.

Additional Notes & Examples

Example 1 is a robotic system for autonomous tunnel navigation, the system comprising: a plurality of sensors configured to navigate in a surrounding environment, the plurality of sensors comprising a ranging sensor and an odometry-based sensor; memory configured to store instructions; and a processor coupled to the memory and the plurality of sensors, the processor configured to execute the instructions to: detect location and movement of the robotic system through the surrounding environment based on sensor measurements obtained from the plurality of sensors; determine if the robotic system is in a tunnel based on the sensor measurements obtained from the plurality of sensors; and navigate with the odometry-based sensor when the robotic system is determined to be in the tunnel or the ranging sensor when the robotic system is determined to be not in the tunnel.

In Example 2, the subject matter of Example 1 optionally includes wherein the ranging sensor comprises at least one of a light detection and ranging (LIDAR) sensor or a radio detection and ranging (RADAR) sensor.

In Example 3, the subject matter of any one or more of Examples 1-2 optionally include wherein the odometry-based sensor comprises a sensor that tracks wheel rotation count, wheel rotation speed, or robotic leg movement.

In Example 4, the subject matter of any one or more of Examples 1-3 optionally include wherein the processor is further configured to execute instructions to build and update a map of the surrounding environment based on the ranging sensor.

In Example 5, the subject matter of any one or more of Examples 1-4 optionally include wherein to determine if the robotic system is in the tunnel and navigate the robotic system, the processor is configured to execute instructions to: perform ranging sensor measurements of the environment; group the measurements into measurement groups, each measurement in a respective measurement group having a substantially same distance from the robotic system as other measurements in the respective measurement group; determine if each measurement group has a respective correlation greater than a threshold; determine if the measurement groups represent parallel lines; and use the odometry-based sensor for navigation when the measurement groups represent parallel lines and the respective correlation of each measurement group is greater than the threshold.

In Example 6, the subject matter of any one or more of Examples 1-5 optionally include wherein to determine if the robotic system is in the tunnel and navigate the robotic system, the processor is configured to execute instructions to: select a plurality of ranging sensor measurement pairs; determine a respective slope of a line between each respective measurement pair to form an array of slopes; determine a slope error threshold for the array of slopes; determine a percentage of slopes in the array of slopes that exceed the slope error threshold; determine a standard deviation of the array of slopes; and use the odometry-based sensor for navigation when the percentage of slopes is less than an outlier threshold and the standard deviation is less than a standard deviation threshold.

In Example 7, the subject matter of Example 6 optionally includes—sigma process based on empirical research.

In Example 8, the subject matter of Example 7 optionally includes wherein the slope error threshold is on either side of a mean of slopes of the array of slopes.

In Example 9, the subject matter of any one or more of Examples 6-8 optionally include wherein the processor is configured to execute the instructions to: select the plurality of ranging sensor measurement pairs as (Pn−x, Pn), wherein x>1, n represents a measurement data point number, Pn−x represents a first sensor measurement point having an x-axis and a y-axis coordinate, and Pn represents a second sensor measurement point having a second x-axis and a second y-axis coordinate.

In Example 10, the subject matter of Example 9 optionally includes wherein the robotic system is at an origin of the x-axis and the y-axis coordinates for each sensor measurement.

Example 11 is a method for autonomous tunnel navigation with a robotic system, the method comprising: detecting movement of the robotic system through a surrounding environment based on sensor measurements from a plurality of sensors comprising a ranging sensor and an odometry-based sensor; determining, based on the sensor measurements, if the surrounding environment is a tunnel environment; and navigating with the odometry-based sensor when the surrounding environment is determined to be the tunnel environment or navigating with the ranging sensor when the surrounding environment is determined to be a non-tunnel environment.

In Example 12, the subject matter of Example 11 optionally includes wherein determining if the surrounding environment is the tunnel environment and navigating the robotic system comprises: performing ranging sensor measurements of the environment; grouping the measurements into measurement groups, each measurement in a respective measurement group having a substantially same distance from the robotic system as other measurements in the respective measurement group; determining if each measurement group has a respective correlation greater than a threshold; determining if the measurement groups represent parallel lines; and navigating with the odometry-based sensor when the measurement groups represent parallel lines and the respective correlation of each measurement group is greater than the threshold.

In Example 13, the subject matter of any one or more of Examples 11-12 optionally include wherein determining if the surrounding environment is the tunnel environment and navigating the robotic system comprises: selecting a plurality of ranging sensor measurement pairs; determining a respective slope of a line between each respective measurement pair to form an array of slopes; determining a slope error threshold for the array of slopes; determining a percentage of slopes in the array of slopes that exceed the slope error threshold; determining a standard deviation of the array of slopes; and navigating with the odometry-based sensor when the percentage of slopes is less than an outlier threshold and the standard deviation is less than a standard deviation threshold.

In Example 14, the subject matter of Example 13 optionally includes—sigma process.

In Example 15, the subject matter of Example 14 optionally includes wherein the slope error threshold is three standard deviations on either side of a mean of slopes of the array of slopes.

In Example 16, the subject matter of Example 15 optionally includes determining the outlier threshold and the standard deviation threshold using empirical analysis.

In Example 17, the subject matter of any one or more of Examples 11-16 optionally include wherein each sensor measurement is represented by an x-axis coordinate and a y-axis coordinate and the robotic system represents an origin of the x-axis and the y-axis for each measurement.

Example 18 is at least one computer-readable medium comprising instructions for executing autonomous tunnel navigation by a robotic system that, when executed by a computer, cause the computer to perform any one of the method Examples of 11-17.

Example 19 is an apparatus comprising means for performing any of the methods of Examples 11-17.

Example 20 is at least one computer-readable medium comprising instructions for autonomous tunnel navigation by a robotic system, when executed by a computer, cause the computer to: detect movement of the robotic system through a surrounding environment based on sensor measurements from a plurality of sensors comprising a ranging sensor and an odometry-based sensor; determine, based on the sensor measurements obtained from the plurality of sensors, if the surrounding environment is a tunnel environment; and navigate with the odometry-based sensor when the surrounding environment is determined to be the tunnel environment or navigate with the ranging sensor when the surrounding environment is determined to be a non-tunnel environment.

In Example 21, the subject matter of Example 20 optionally includes wherein the instructions further cause the computer to: perform ranging sensor measurements of the environment; group the measurements into measurement groups, each measurement in a respective measurement group having a substantially same distance from the robotic system as other measurements in the respective measurement group; determine if each measurement group has a respective correlation greater than a threshold; determine if the measurement groups represent parallel lines; and navigate with the odometry-based sensor when the measurement groups represent parallel lines and the respective correlation of each measurement group is greater than the threshold.

In Example 22, the subject matter of Example 21 optionally includes wherein the instructions further cause the computer to navigate with a LIDAR-based sensor when either the measurement groups represent non-parallel lines or the respective correlation of each measurement group is less than the threshold.

In Example 23, the subject matter of Example 22 optionally includes wherein the instructions further cause the computer to determine that the measurement groups represent non-parallel lines based on respective slopes of lines represented by the measurement groups.

In Example 24, the subject matter of any one or more of Examples 20-23 optionally include wherein the instructions further cause the computer to: select a plurality of ranging sensor measurement pairs; determine a respective slope of a line between each respective measurement pair to form an array of slopes; determine a slope error threshold for the array of slopes; determine a percentage of slopes in the array of slopes that exceed the slope error threshold; determine a standard deviation of the array of slopes; and navigate with the odometry-based sensor when the percentage of slopes is less than an outlier threshold and the standard deviation is less than a standard deviation threshold.

In Example 25, the subject matter of Example 24 optionally includes—sigma process, for outlier slopes that are beyond a threshold from a mean of the array of slopes.

Example 26 is a system for autonomous tunnel navigation with a robotic system, the system comprising: means for detecting movement of the robotic system through a surrounding environment based on sensor measurements from a plurality of sensors comprising a ranging sensor and an odometry-based sensor; means for determining, based on the sensor measurements, if the surrounding environment is a tunnel environment; and means for navigating with the odometry-based sensor when the surrounding environment is determined to be the tunnel environment or navigating with the ranging sensor when the surrounding environment is determined to be a non-tunnel environment.

In Example 27, the subject matter of Example 26 optionally includes means for performing ranging sensor measurements of the environment; means for grouping the measurements into measurement groups, each measurement in a respective measurement group having a substantially same distance from the robotic system as other measurements in the respective measurement group; means for determining if each measurement group has a respective correlation greater than a threshold; means for determining if the measurement groups represent parallel lines; and means for navigating with the odometry-based sensor when the measurement groups represent parallel lines and the respective correlation of each measurement group is greater than the threshold.

In Example 28, the subject matter of any one or more of Examples 26-27 optionally include means for selecting a plurality of ranging sensor measurement pairs; means for determining a respective slope of a line between each respective measurement pair to form an array of slopes; means for determining a slope error threshold for the array of slopes; means for determining a percentage of slopes in the array of slopes that exceed the slope error threshold; means for determining a standard deviation of the array of slopes; and means for navigating with the odometry-based sensor when the percentage of slopes is less than an outlier threshold and the standard deviation is less than a standard deviation threshold.

In Example 29, the subject matter of Example 28 optionally includes wherein the means for determining the slope error threshold comprises means for filtering slope outliers in the array of slopes using a three-sigma process.

In Example 30, the subject matter of Example 29 optionally includes wherein the slope error threshold and is three standard deviations on either side of a mean of the slopes of the array of slopes.

In Example 31, the subject matter of Example 30 optionally includes means for determining the outlier threshold and the standard deviation threshold using empirical analysis.

In Example 32, the subject matter of any one or more of Examples 26-31 optionally include wherein each sensor measurement is represented by an x-axis coordinate and a y-axis coordinate and the robotic system represents an origin of the x-axis and y-axis for each measurement.

Example 33 is a robotic system for autonomous tunnel navigation, the system comprising: a plurality of sensors configured to navigate in a surrounding environment, the plurality of sensors comprising a ranging sensor and an odometry-based sensor; ranging circuitry to access sensor measurements from the ranging sensor and detect location and movement of the robotic system through the surrounding environment; tunnel detection circuitry to determine if the robotic system is in a tunnel based on the sensor measurements from the ranging sensor; and navigation circuitry to navigate the robotic system with the odometry-based sensor when the robotic system is determined to be in the tunnel or the ranging sensor when the robotic system is determined to be not in the tunnel.

In Example 34, the subject matter of Example 33 optionally includes wherein the ranging sensor comprises at least one of a light detection and ranging (LIDAR) sensor or a radio detection and ranging (RADAR) sensor.

In Example 35, the subject matter of any one or more of Examples 33-34 optionally include wherein the odometry-based sensor comprises a sensor that tracks wheel rotation count, wheel rotation speed, or robotic leg movement.

In Example 36, the subject matter of any one or more of Examples 33-35 optionally include map building and updating circuitry to build and update a map of the surrounding environment based on the ranging sensor.

In Example 37, the subject matter of any one or more of Examples 33-36 optionally include wherein to determine if the robotic system is in the tunnel and navigate the robotic system: the ranging circuitry and tunnel detection circuitry are configured to perform ranging sensor measurements of the surrounding environment, group the ranging sensor measurements into measurement groups, each measurement in a respective measurement group having a substantially same distance from the robotic system as other measurements in the respective measurement group, determine if each measurement group has a respective correlation greater than a threshold, and determine if the measurement groups represent parallel lines; and the navigation circuitry is configured to use the odometry-based sensor for navigation when the measurement groups represent parallel lines and the respective correlation of each measurement group is greater than the threshold.

In Example 38, the subject matter of any one or more of Examples 33-37 optionally include wherein to determine if the robotic system is in the tunnel and navigate the robotic system: the ranging circuitry and tunnel detection circuitry are configured to select a plurality of ranging sensor measurement pairs, determine a respective slope of a line between each respective measurement pair to form an array of slopes, determine a slope error threshold for the array of slopes, determine a percentage of slopes in the array of slopes that exceed the slope error threshold, and determine a standard deviation of the array of slopes; and the navigation circuitry is configured to use the odometry-based sensor for navigation when the percentage of slopes is less than an outlier threshold and the standard deviation is less than a standard deviation threshold.

In Example 39, the subject matter of Example 38 optionally includes—sigma process based on empirical research.

In Example 40, the subject matter of Example 39 optionally includes wherein the slope error threshold is on either side of a mean of slopes of the array of slopes.

In Example 41, the subject matter of any one or more of Examples 38-40 optionally include wherein the ranging circuitry and tunnel detection circuitry are further configured to: select the plurality of ranging sensor measurement pairs as (Pn−x, Pn), wherein x>1, n represents a measurement data point number, Pn−x represents a first sensor measurement point having an x-axis and a y-axis coordinate, and Pn represents a second sensor measurement point having a second x-axis and a second y-axis coordinate.

In Example 42, the subject matter of Example 41 optionally includes wherein the robotic system is at an origin of the x-axis and the y-axis coordinates for each sensor measurement.

Example 43 is at least one machine-readable medium including instructions, which when executed by a machine, cause the machine to perform operations of any of the operations of Examples 1-42.

Example 44 is an apparatus comprising means for performing any of the operations of Examples 1-42.

Example 45 is a system to perform the operations of any of the Examples 1-42.

Example 46 is a method to perform the operations of any of the Examples 1-42.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A robotic system for autonomous tunnel navigation, comprising:
   a plurality of sensors comprising a ranging sensor and an odometry-based sensor;
   memory configured to store instructions; and
   a processor coupled to the memory and to the plurality of sensors, the processor configured to execute the instructions to:
   detect a location and movement of the robotic system through the surrounding environment based on sensor measurements obtained from the plurality of sensors;
   determine if the robotic system is in a tunnel based on the sensor measurements by (i) performing ranging sensor measurements of the surrounding environment using sensor measurements provided by the ranging sensor, and (ii) determining if walls in the surrounding environment are parallel with one another based upon an analysis of sets of data points identified with the ranging sensor measurements;
   in response to determining that the robotic system is in a tunnel, navigating using sensor measurements provided by the odometry-based sensor; and
   in response to subsequently determining that the robotic system is not in a tunnel, switching from navigating using the sensor measurements provided by the odometry-based sensor to navigating using sensor measurements provided by the ranging sensor.

2. The system of claim 1, wherein the ranging sensor comprises a light detection and ranging (LIDAR) sensor or a radio detection and ranging (RADAR) sensor.

3. The system of claim 1, wherein the odometry-based sensor comprises a sensor that tracks wheel rotation count, wheel rotation speed, or robotic leg movement.

4. The system of claim 1, wherein the processor is further configured to execute the instructions to build and update a map of the surrounding environment based on ranging sensor measurements provided by the ranging sensor.

5. The system of claim 1, wherein the processor is configured to determine if the robotic system is in a tunnel y:
   grouping the sets of data points identified with ranging sensor measurements into measurement groups, each ranging sensor measurement in a respective ranging sensor measurement group indicating a substantially same range from the robotic system;
   determining if each ranging sensor measurement group includes sets of data points representing a line based upon the sets of data points within each ranging sensor measurement group having a respective correlation factor greater than a threshold value;
   determining, for each ranging sensor measurement group including sets of data points representing a line, if the lines associated with each ranging sensor measurement group are parallel with one another; and
   determining that the robotic system is in a tunnel when the lines associated with each ranging sensor measurement group are parallel with one another.

6. The system of claim 1, wherein the processor is configured to determine if the robotic system is in a tunnel by:
   selecting, as the sets of data points identified with the ranging sensor measurements, a plurality of ranging sensor measurement pairs;
   determining a respective slope of a line formed between each one of the plurality of ranging sensor measurement pairs to generate an array of slopes;
   determining a percentage of outlier slopes in the array of slopes that exceed a slope error threshold;
   determining a standard deviation of the array of slopes; and
   determining that the robotic system is in a tunnel when (i) the percentage of the outlier slopes is less than an outlier threshold, and (ii) the standard deviation is less than a standard deviation threshold.

7. The system of claim 6, wherein the processor is configured to determine the slope error threshold using a 3-sigma process that is based on empirical research.

8. The system of claim 7, wherein the slope error threshold is a threshold value that is represented on either side of a mean of slopes of the array of slopes.

9. The system of claim 6, wherein the processor is configured to execute the instructions to:
   select the plurality of ranging sensor measurement pairs as ($P_{n-x}$, $P_n$),
   wherein $x > 1$,
   n represents a measurement data point number,
   $P_{n-x}$ represents a first ranging sensor measurement point from among the plurality of ranging sensor measurement pairs having an x-axis and a y-axis coordinate, and Pn represents a second sensor measurement point from among the plurality of ranging sensor measurement pairs having a second x-axis and a second y-axis coordinate.

10. The system of claim 9, wherein the robotic system is located at an origin of the x-axis and the y-axis coordinates for each ranging sensor measurement from among the plurality of ranging sensor measurement pairs.

11. A method for autonomous tunnel navigation with a robotic system, the method comprising:
   detecting movement of the robotic system through a surrounding environment based on sensor measurements provided by a plurality of sensors comprising a ranging sensor and an odometry-based sensor;
   determining, based on the sensor measurements, if the surrounding environment is a tunnel environment by (i) performing ranging sensor measurements of the surrounding environment using sensor measurements provided by the ranging sensor, and (ii) determining if walls in the surrounding environment are parallel with one another based upon an analysis of sets of data points identified with the ranging sensor measurements; and
   in response to determining that the surrounding environment is a tunnel environment, navigating using sensor measurements provided by the odometry-based sensor; and
   in response to subsequently determining that the surrounding environment is a non-tunnel environment, switching from navigating using the sensor measurements provided by the odometry-based sensor to navigating using sensor measurements provided by the ranging sensor.

12. The method of claim 11, wherein the act of determining if the surrounding environment is a tunnel environment comprises:
   grouping sets of data points identified with the ranging sensor measurements into measurement groups, each ranging sensor measurement in a respective ranging sensor measurement group indicating a substantially same range from the robotic system;
   determining if each ranging sensor measurement group includes sets of data points representing a line based upon the sets of data points within each ranging sensor measurement group having a respective correlation factor greater than a threshold value;
   determining, for each ranging sensor measurement group including sets of data points representing a line, if the lines associated with each ranging sensor measurement group are parallel with one another; and
   determining that the surrounding environment is a tunnel environment when the lines associated with each ranging sensor measurement group are parallel with one another.

13. The method of claim 11, wherein the act of determining if the surrounding environment is a tunnel environment comprises:
   selecting, as the sets of data points identified with the ranging sensor measurements, a plurality of ranging sensor measurement pairs;
   determining a respective slope of a line formed between each one of the plurality of ranging sensor measurement pairs to form an array of slopes;
   determining a percentage of outlier slopes in the array of slopes that exceed a slope error threshold;
   determining a standard deviation of the array of slopes; and
   determining that the surrounding environment is a tunnel environment when (i) the percentage of the outlier slopes is less than an outlier threshold, and (ii) the standard deviation is less than a standard deviation threshold.

14. The method of claim 13, the act of determining the percentage of outlier slopes comprises filtering slope outliers in the array of slopes using a 3-sigma process.

15. The method of claim 14, wherein the slope error threshold is a threshold value that is represented by three standard deviations on either side of a mean of the slopes of the array of slopes.

16. The method of claim 15, further comprising:
   determining the outlier threshold and the standard deviation threshold using empirical analysis.

17. The method of claim 11, wherein each data point from among the sets of data points identified with the ranging sensor measurements is represented by an x-axis coordinate and a y-axis coordinate, and
   wherein the robotic system is located at an origin of the x-axis and y-axis for each one of the ranging sensor measurements.

18. The method of claim 11, further comprising obtaining sensor measurements provided by the odometry-based sensor and sensor measurements provided by the ranging sensor substantially simultaneously.

19. A non-transitory computer-readable medium comprising instructions for autonomous tunnel navigation by a robotic system that, when executed by a computer, cause the computer to:
   detect movement of the robotic system through a surrounding environment based on sensor measurements provided by a plurality of sensors comprising a ranging sensor and an odometry-based sensor;
   determine, based on the sensor measurements, if the surrounding environment is a tunnel environment by (i) performing ranging sensor measurements of the surrounding environment using sensor measurements provided by the ranging sensor, and (ii) determining if walls in the surrounding environment are parallel with one another based upon an analysis of sets of data points identified with the ranging sensor measurements;
   in response to determining that the surrounding environment is a tunnel environment, navigating using sensor measurements provided by the odometry-based sensor when the surrounding environment is determined to be a tunnel environment; and
   in response to subsequently determining that the surrounding environment is a non-tunnel environment, switching from navigating using the sensor measurements provided by the odometry-based sensor to navigating using sensor measurements provided by the ranging sensor.

20. The non-transitory computer-readable medium of claim 19, wherein the instructions further cause the computer to determine if the surrounding environment is a tunnel environment by:
   grouping the sets of data points identified with the ranging sensor measurements into measurement groups, each ranging sensor measurement in a respective ranging sensor measurement group indicating a substantially same range from the robotic system;
   determine if each ranging sensor measurement group includes sets of data points representing a line based upon the sets of data points within each ranging sensor measurement group having a respective correlation factor greater than a threshold value;

determine, for each ranging sensor measurement group including sets of data points representing a line, if the lines associated with each ranging sensor measurement group are parallel with one another; and determine that the surrounding environment is a tunnel environment when the lines associated with each ranging sensor measurement group are parallel with one another.

21. The non-transitory computer-readable medium of claim 20, wherein the instructions further cause the computer to determine that the surrounding environment is not a tunnel environment when either (i) the lines associated with each ranging sensor measurement group are no parallel with one another, or (ii) the data points representing a line for each ranging sensor measurement group have a respective correlation factor that is less than the threshold value.

22. The non-transitory computer-readable medium of claim 21, wherein the instructions further cause the computer to determine that the lines associated with each ranging sensor measurement group are not parallel with one another based on respective slopes of pairs of the sets of data points within each respective ranging sensor measurement group.

23. The non-transitory computer-readable medium of claim 19, wherein the instructions cause the computer to determine that the surrounding environment is a tunnel environment by:

selecting, as the sets of data points identified with the ranging sensor measurements, a plurality of ranging sensor measurement pairs;

determining a respective slope of a line formed between each one of the plurality of ranging sensor measurement pairs to form an array of slopes;

determining a percentage of outlier slopes in the array of slopes that exceed a slope error threshold;

determining a standard deviation of the array of slopes; and determining that the surrounding environment is a tunnel environment when (i) the percentage of the outlier slopes is less than an outlier threshold, and (ii) the standard deviation is less than a standard deviation threshold.

24. The non-transitory computer-readable medium of claim 23, wherein the instructions further cause the computer to determine the percentage of outlier slopes by filtering slope outliers in the array of slopes using a three-sigma process.

* * * * *